United States Patent [19]

Woodcock

[11] Patent Number: 5,687,950
[45] Date of Patent: Nov. 18, 1997

[54] FIBER OPTIC LINKED FLUID BLOCK SYSTEM

[76] Inventor: Jeffery Woodcock, 50 Penny Rd., Crawfordville, Fla. 32327

[21] Appl. No.: 550,026

[22] Filed: Oct. 30, 1995

[51] Int. Cl.⁶ .............................. F16K 31/04; F16K 31/53
[52] U.S. Cl. .................... 251/129.2; 251/129.11; 251/129.04; 251/230; 251/288
[58] Field of Search ............................ 251/129.2, 129.15, 251/129.04, 230, 129.11, 248, 288

[56] References Cited

U.S. PATENT DOCUMENTS

| | | | |
|---|---|---|---|
| 4,306,314 | 12/1981 | Griffiths | 251/129.04 X |
| 4,772,257 | 9/1988 | Hakim et al. | 251/129.2 X |
| 4,838,310 | 6/1989 | Scott et al. | 251/129.04 X |
| 4,949,937 | 8/1990 | Waldrum | 251/230 X |
| 5,134,386 | 7/1992 | Swanic | |
| 5,194,847 | 3/1993 | Taylor et al. | |
| 5,351,781 | 10/1994 | Pritchard et al. | |
| 5,381,996 | 1/1995 | Arnemann et al. | 251/248 X |
| 5,420,568 | 5/1995 | Iida et al. | |

*Primary Examiner*—Kevin Lee
*Attorney, Agent, or Firm*—Peter Loffler

[57] ABSTRACT

A fiber-optic linked anti-tamper fluid block system is disclosed. The device comprises a fluid blocking means, disposable within the fluid flow path of a fluid line, and a control means for control of the fluid blocking means. The control means electronically communicates with the fluid blocking means via a fiber optic link. The control means has an input means, such as a magnetic strip card reader, computer chip key, electronic key switch, electronic alphanumeric keypad, voice recognition module, or other similar appliance, for receiving an authorized signal from the user to permit device operation. The control means prevents the fluid line bearing apparatus from operating when the device is activated and also prevents device activation when the apparatus is operational.

19 Claims, 16 Drawing Sheets

FIBER OPTIC LINKED FLUID BLOCK SYSTEM

BACKGROUND OF THE INVENTION

1. Field of the Invention

The present invention relates to a fluid blocking mechanism having electronic control and an anti-tamper fiber optic link therebetween.

2. Background of the Prior Art

There is no question that vehicle theft is a major crime problem not only in urban settings but also increasingly in rural settings. Many devices have been proposed in order to combat vehicle theft including steering wheel locks, alarm systems, vehicle electronic disablers, satellite tracking systems, and vehicle fluid line blocks among others. Such devices have an extensive range of price and complexity from the very simple and inexpensive to the very exotic and pricey. One type of anti-theft system that strikes a good balance between price and performance is the fluid line block type system.

Such systems, which typically blocks either the brake lines, exhaust lines, power steering fluid lines, vacuum lines, air intake lines, or the fuel lines in order to disable the vehicle, are extremely reliable while being economically feasible for installation on any vehicle. Although these systems are hard to defeat, they do have an Achilles heal. In order to properly operate this type of system, some form of electronic control is necessary to activate and deactivate the system. The electronic control is wired to the mechanism performing the fluid blocking. Appropriately activating the electronic control results in the control energizing the mechanism through the wire link. A determined thief will simply disassemble the electronic control or cut the wire link and energize the electrical link to the blocking mechanism and thereby bypass the system. An experienced thief will find such bypassing can be accomplished very quickly.

A fluid-blocking type of vehicle anti-tamper system is needed whereby the above-mentioned loophole is plugged up. Such a device should have a control system that is almost impossible to bypass by even the most resourceful thief. The device must be as reliable as currently available systems and cost-wise should be in line with current systems.

Many other application areas can benefit from having a fluid blocking mechanism having anti-tamper attributes. Such areas include industrial process, commercial, military, and marine applications.

SUMMARY OF THE INVENTION

The fiber optic linked anti-tamper fluid block device of the present invention meets the aforementioned needs in the art. The device comprises a fluid blocking means, disposed within a fluid line and a control means for controlling the fluid blocking means. The control means, upon receiving an authorized input code from the user through an input means, sends an infrared activation signal to the fluid blocking means via a fiber optic link. The use of the fiber optic link, as opposed to a standard electrical wire, prevents a thief, or other non-authorized person from disassembling the control means or electrical wire link and manually applying an electrical activation signal to the fluid block means and thereby defeating the system. The infrared signal transmitted to the fluid blocking means is substantially more difficult for even a very sophisticated person to override.

An example of a fluid blocking means is also disclosed. The device comprises a housing having a fluid chamber that is positioned in the fluid flow path of a fluid line. The device has a block valve means such that in an open position, the block valve means permits fluid flow through the fluid chamber and thus the fluid line. In such a state, the fluid line bearing apparatus operates in normal fashion. In a closed position, the block valve means prevents fluid flow through the fluid chamber and thus the fluid line. In such a position, apparatus operation is disabled. The block valve means can comprise a butterfly valve, a ball valve, a metering valve, a slide valve, a piston valve, or any other appropriate valve.

The block valve means is engaged by an articulating ratchet gear. The articulating ratchet gear is in turn controlled by a solenoid. Solenoid operation is controlled by the control means. The solenoid causes translation of the ratchet gear which engages and rotates the block valve means into either an open or closed position, as appropriate.

A second example of fluid blocking means comprises a block valve that is engaged by an articulating slotted disk. The articulating slotted disk is in turn controlled by a rotating drive member. The drive member is rotated by a reversible electric motor, which is in turn controlled by the control means. A reduction gear assembly, of any appropriate type can be interposed between the reversible motor and the drive member in order to reduce the speed and increase the torque of the drive member. As such, the electric motor causes rotation of the reduction gear, which in turn rotates the drive member which engages and rotates the slotted disk thereby rotating the block valve means into either an open or closed position, as appropriate The control means detects an authorized activation signal through an input means that can comprise a magnetic strip card reader, a computer chip key reader, electronic key switch, keypad, voice recognition module, or other similar device for receiving a signal from a user and validating the signal so entered and thereby activating the control means.

The control means also prevents the fluid block laden apparatus from operating when block valve means is in a closed position. The control means also prevents fluid blocking means from operating when the fluid block laden device is on.

BRIEF DESCRIPTION OF THE DRAWINGS

Similar reference numerals refer to similar parts throughout the several views of the drawings.

DETAILED DESCRIPTION OF THE PREFERRED EMBODIMENT

Figure 1:
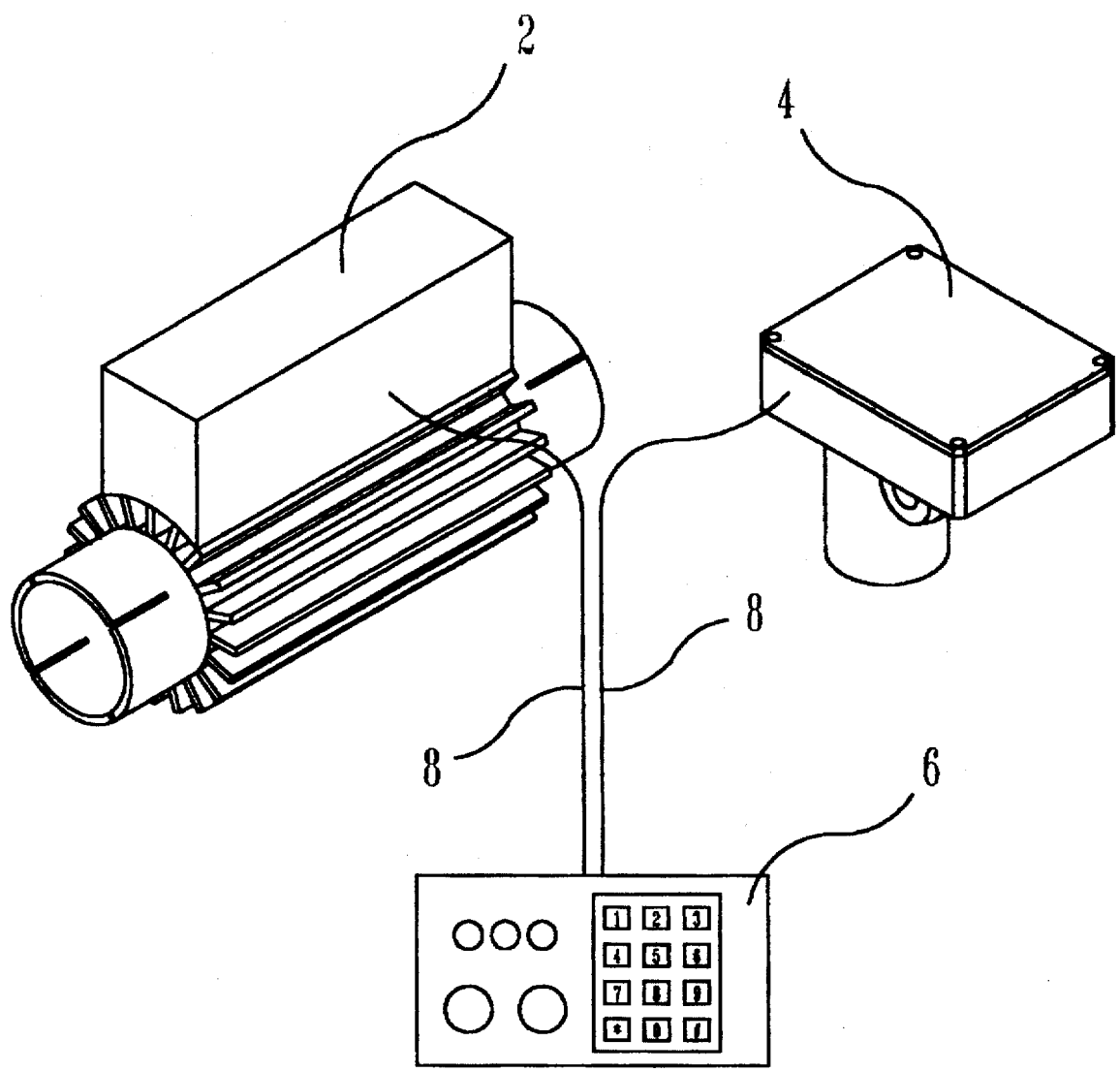
FIG. 1 is a perspective view of the fiber-optic link fluid block device of the present invention with both embodiments of the fluid block means disclosed.
Figure 2:
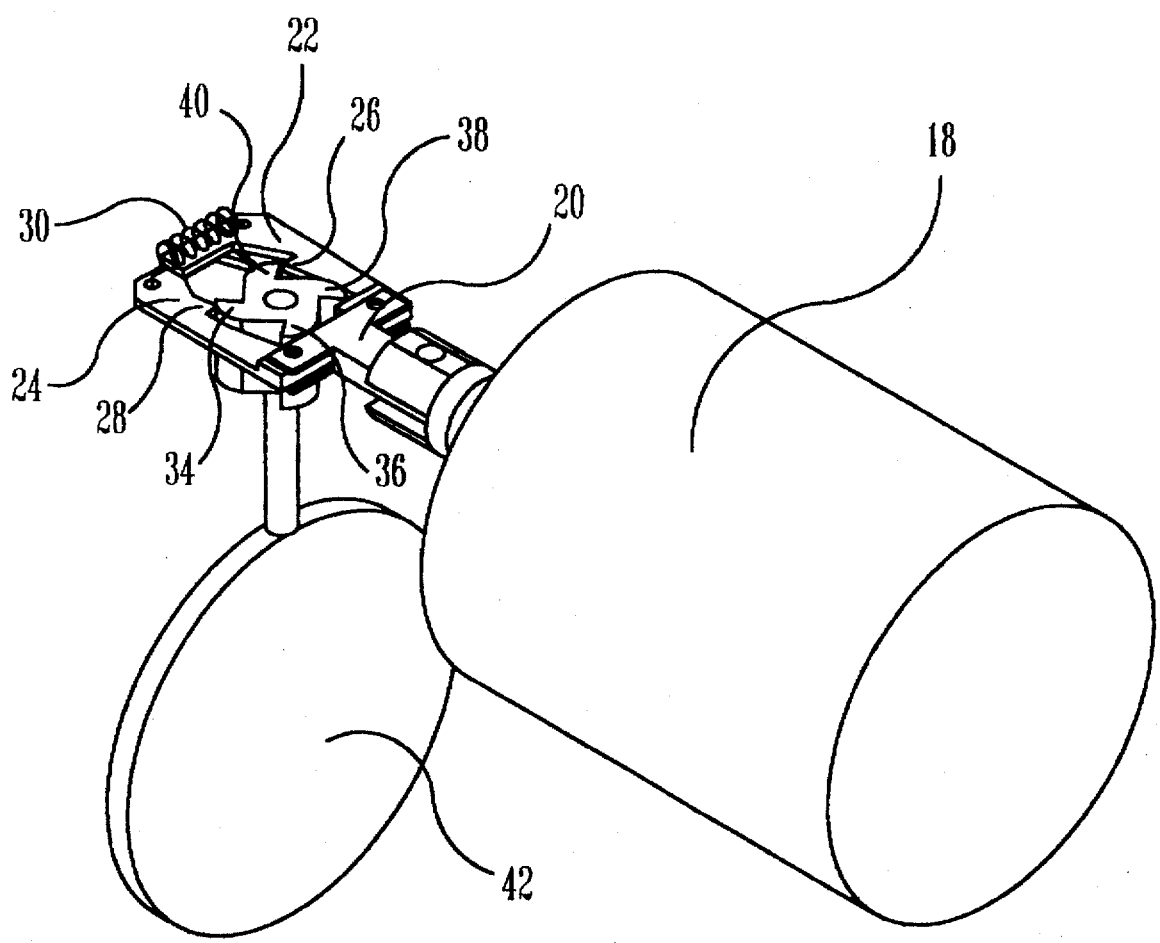
FIG. 2 is an isometric view of the first embodiment of the fluid block means.

As seen in FIG. 1, the fiber optic linked fluid block system of the present system comprises a blocking means 2 or 4 for blocking and unblocking the flow of fluid within a fluid line, a control means 6, for controlling the blocking means and a fiber optic link means 8 for electronically linking the control means 6 with the blocking means.

The blocking means is designed to be installed within the flow path of a device's fluid line or lines. Specifically, the device can be used in a vehicle with the blocking means installed in a vehicle's brake lines, vacuum lines, fuel lines, power steering lines, air intake lines, exhaust lines or other fluid lines. The blocking means will either block the flow of fluid through the installed line, rendering the fluid line bearing apparatus inoperable, or unblock the flow of fluid through the line, rendering the apparatus operable. The blocking means can be any device that performs an effective block of fluid flow.

Figure 3A:
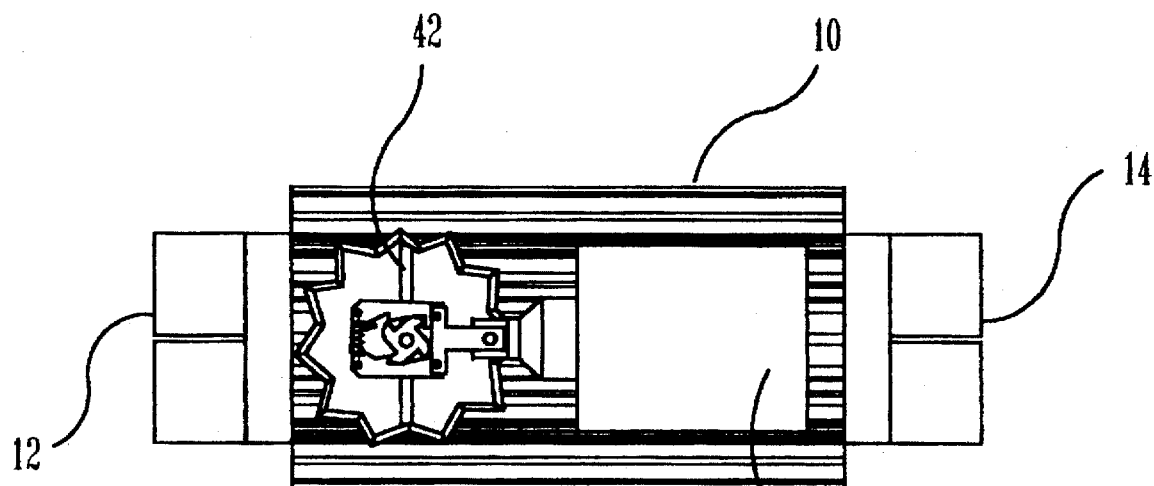
FIGS. 3a–3c are cutaway views of the first embodiment of the fluid block means executing a fluid block cycle.
Figure 3B:
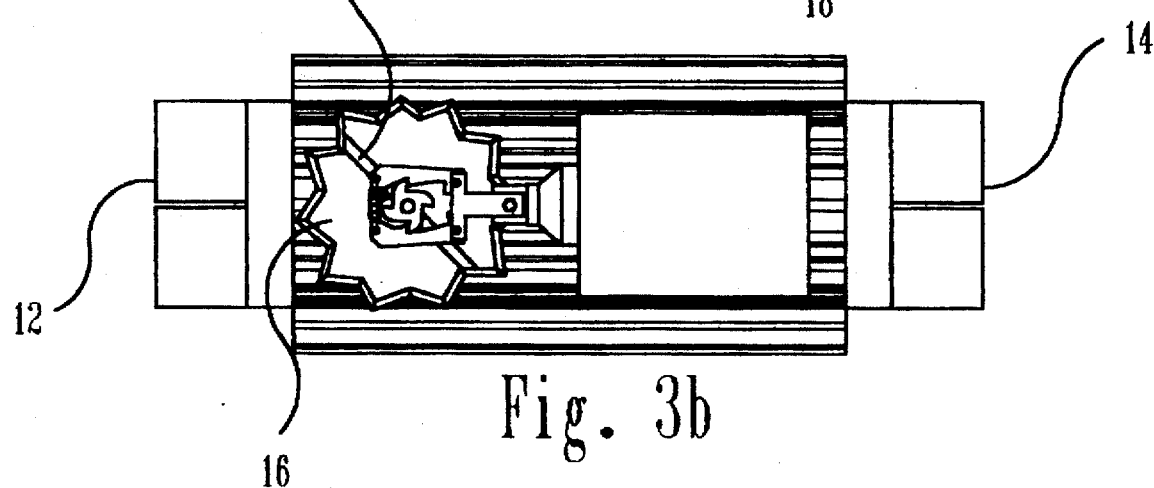
Figure 3C:
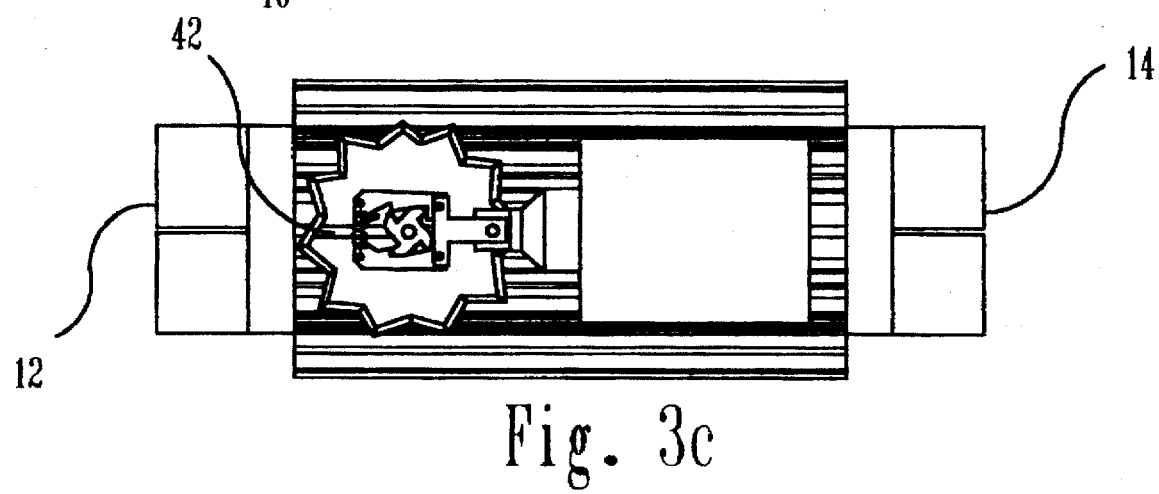

FIGS. 3a–3c, disclose an embodiment of a blocking means 2. As seen, this blocking means 2 comprises a housing unit 10 having a first fluid opening 12, a second fluid opening 14 and a fluid flow chamber 16 connecting the two openings. The housing unit 10 is disposed within the fluid flow path of a selected fluid line. The fluid line is separated into two sections and the housing unit 10 placed into the separated space such that one of the sections of the fluid line is attached to the first opening 12 while the other section of the fluid line is attached to the second opening 14. As such, the fluid chamber 16 will place the two sections of fluid line into fluid connection with one another.

A solenoid 18 is disposed within the housing unit 10. Attached to the shaft 20 of the solenoid 18 are two ratcheting arms 22 and 24. The upper ratcheting arm 22 has a tooth 26 located midway on the length of the arm 22 and the lower arm 24 has a tooth 28 midway on the length of the arm 24 facing the opposite direction as tooth 26 on ratcheting arm 22. A spring 30 connects the first arm 22 and the second arm 24. A ratchet gear 32 having a first tooth 34, second tooth 36, third tooth 38, and a fourth tooth 40 is rotatably located within the housing unit 10. A block valve means 42 is disposed within the fluid chamber 16 and is connected to the ratchet gear 32. The block valve means 42 is in corresponding shape to the shape of the fluid chamber 16, and when appropriately positioned, the block valve means 42 blocks fluid flow within the fluid chamber 16.

Figure 4A:
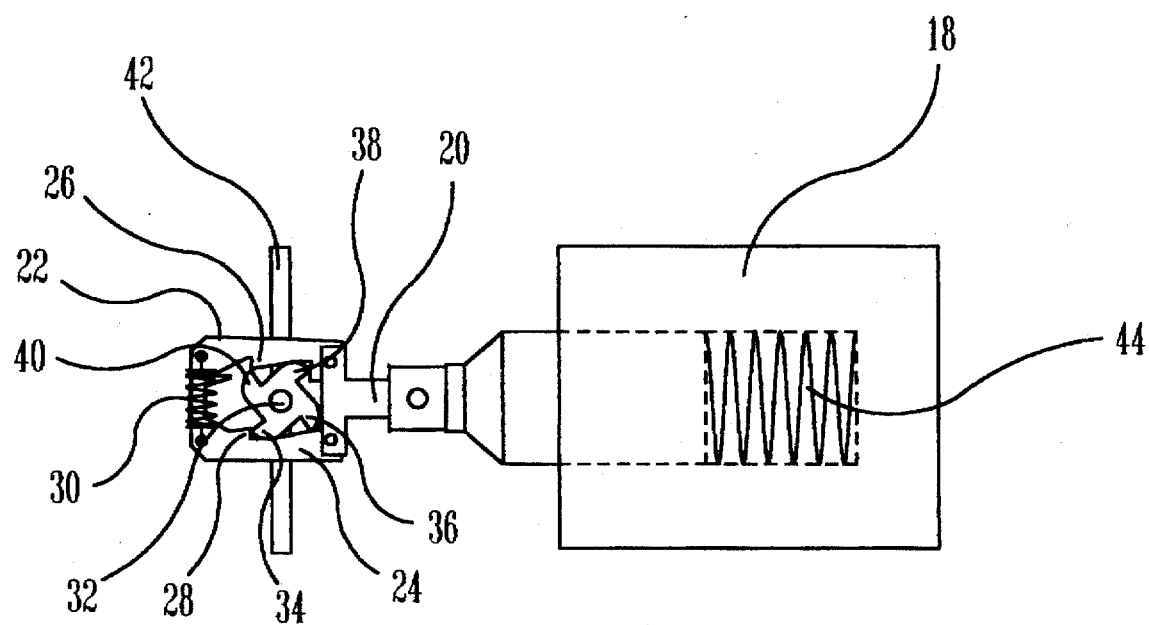
FIGS. 4a–4g are close-up views of the internal members of the first embodiment of the fluid block means executing a fluid block cycle.
Figure 4B:
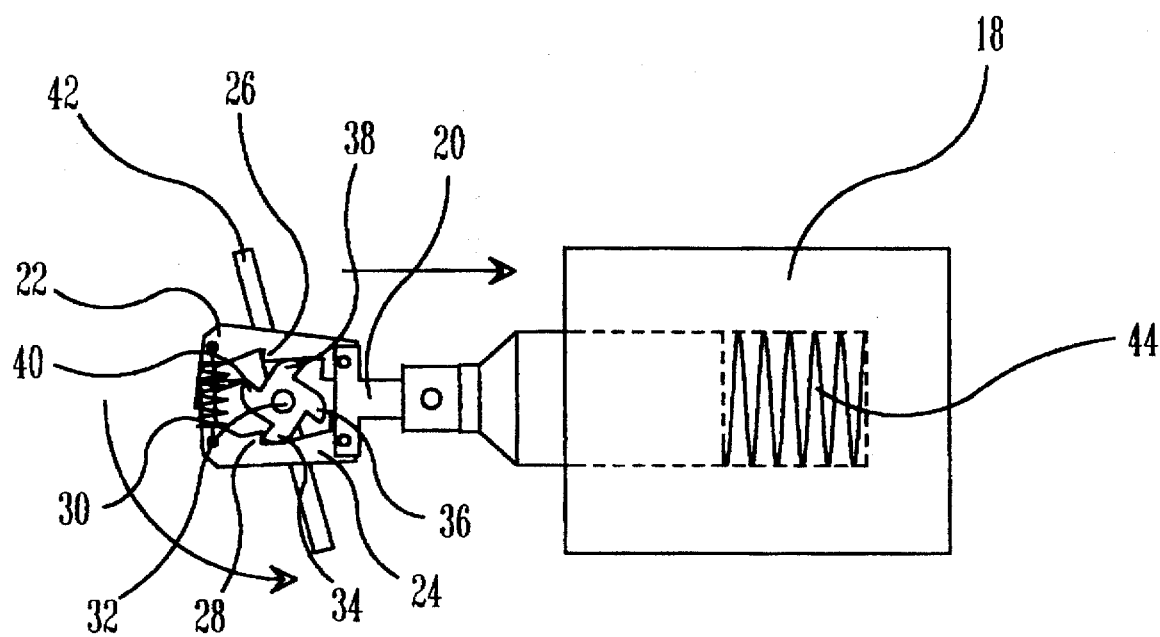
Figure 4C:
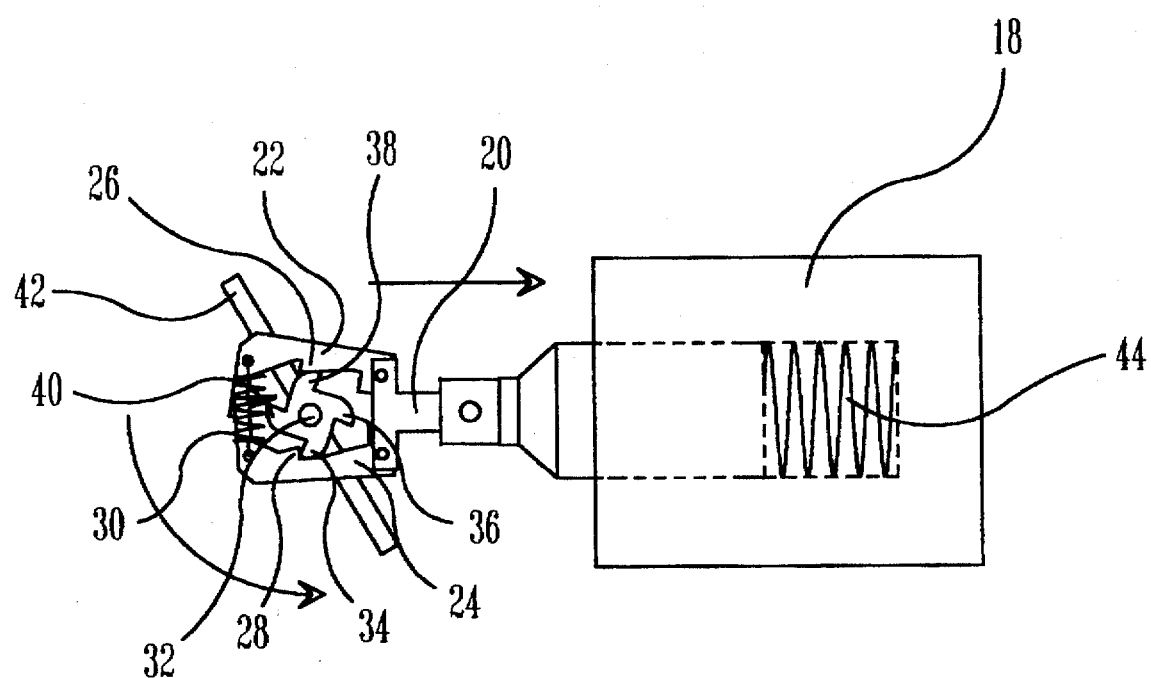
Figure 4D:
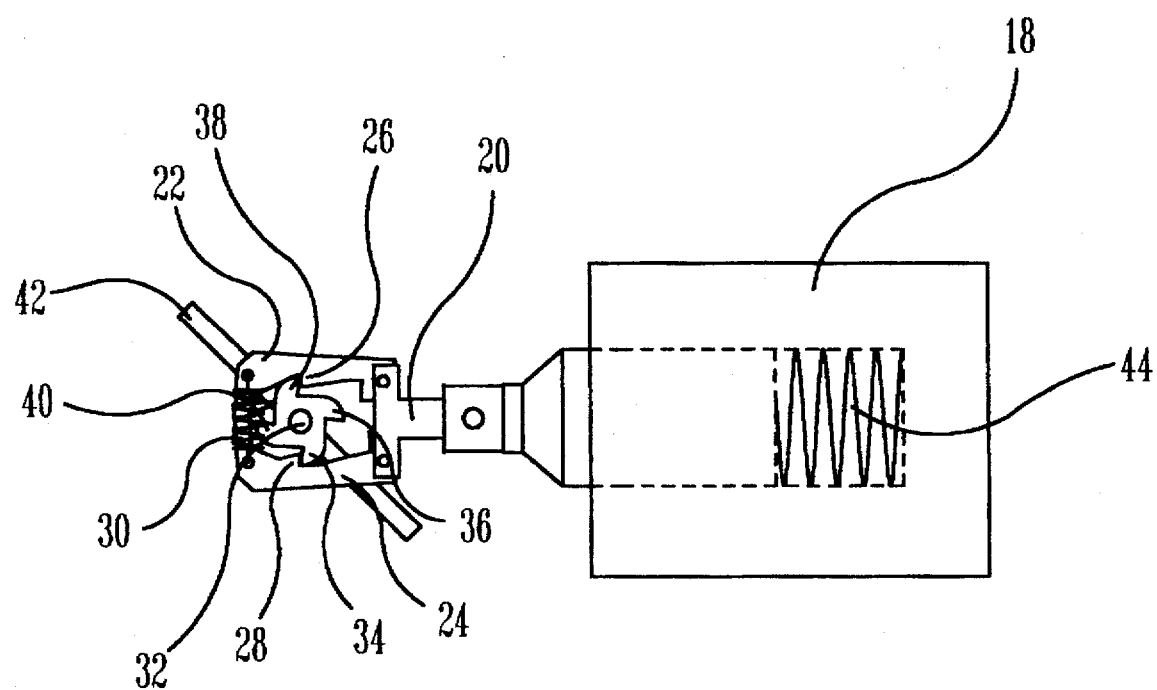
Figure 4E:
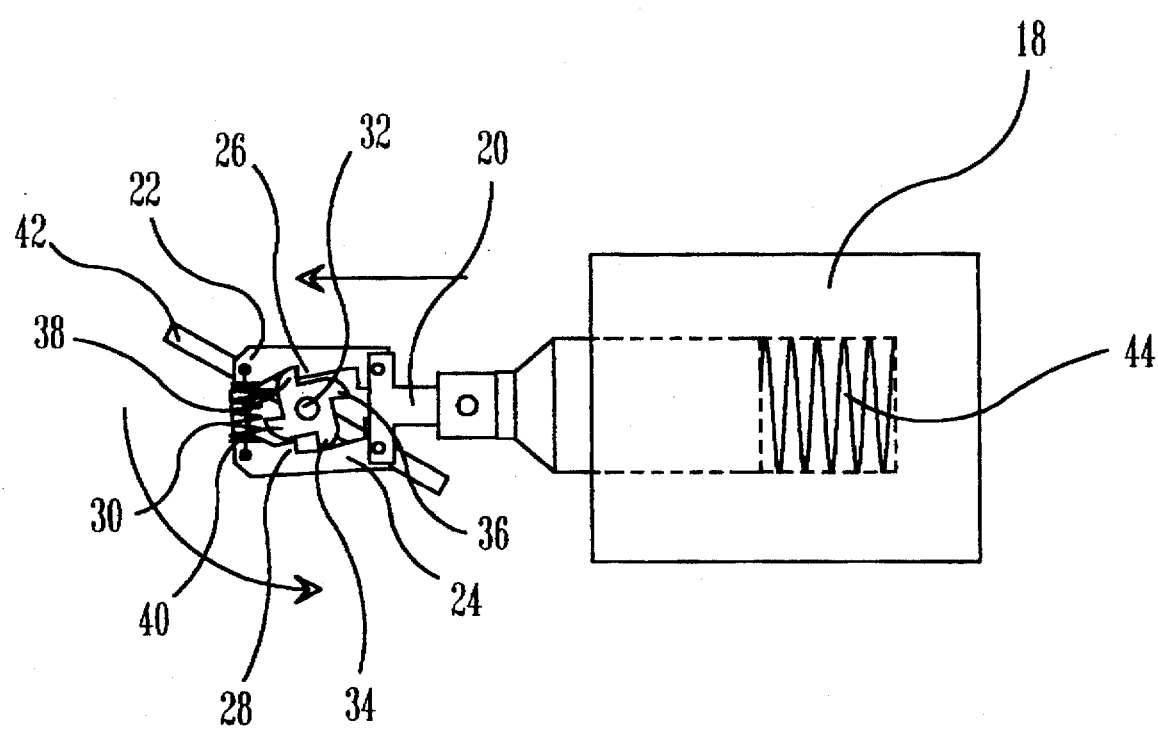
Figure 4F:
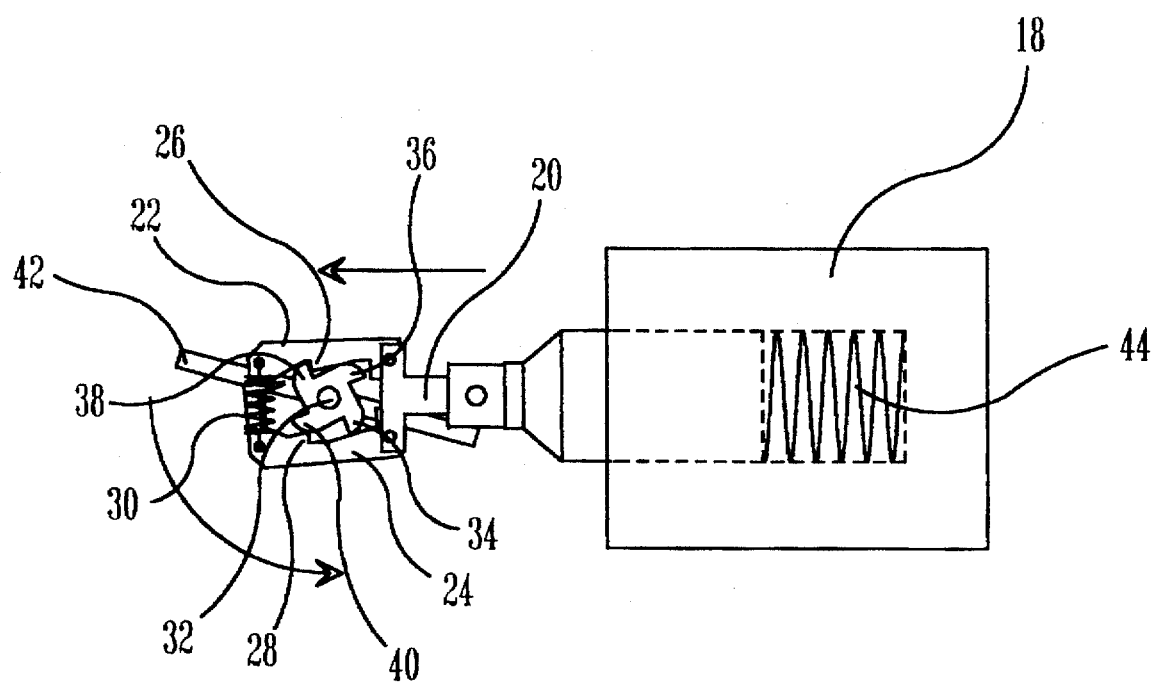
Figure 4G:
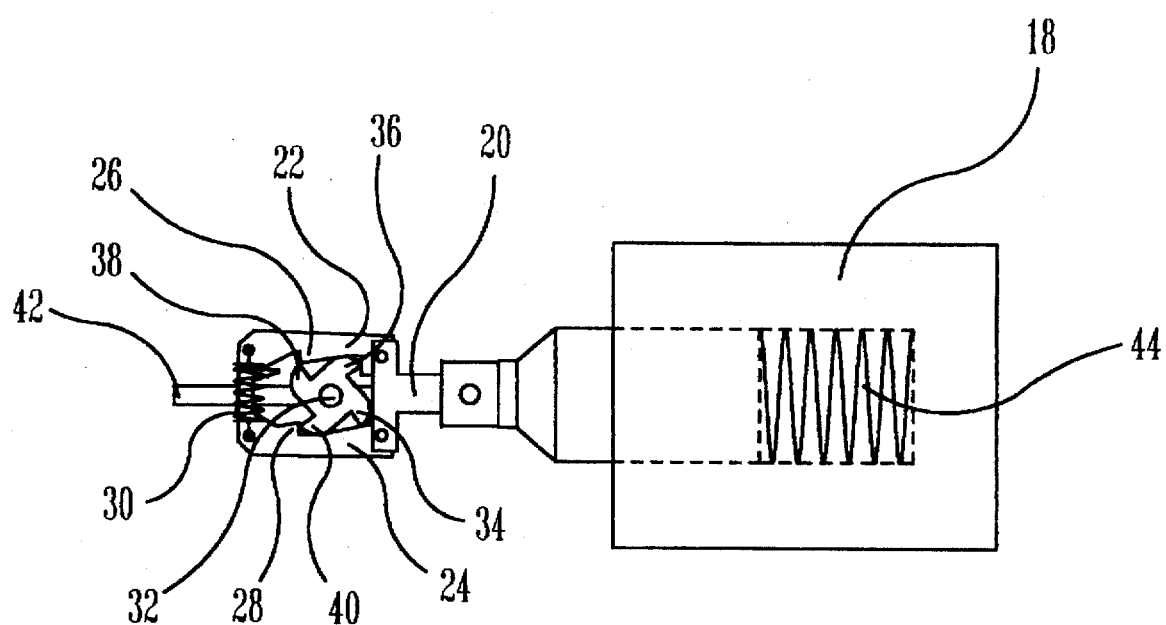

FIGS. 4a–4g illustrate the operation of the blocking mechanism within the housing unit 10. Initially, the solenoid 18 and the block valve means 42 are in a relaxed state (FIG. 4b). The block valve means 42 is positioned so as to block fluid flow through the fluid chamber 16 (FIG. 3a). When the solenoid 18 is energized, the solenoid arm 20 is retracted causing the solenoid arm 20 to pull the two ratcheting arms 22 and 24. As seen, the retracting lower ratcheting arm 24 causes its tooth 28 to engage with a tooth of the ratchet gear 32 (the first tooth 34, as illustrated by example), translating the ratchet gear 32 and its attached block valve means 42 counterclockwise (FIGS. 4b, 4c). The rounded ends of the teeth 34–40 of the ratchet gear 32 assure that the non-engaged teeth of the ratchet gear 32 do not interfere with the ratcheting arm 22. The spring 30 prevents the two ratcheting arms 22 and 24 from flying apart. When the solenoid 18 stops its stroke, the ratchet gear 32 and block valve means 42 have rotated 45 degrees (FIG. 4d). Thereafter, the solenoid 18 is de-energized and begins its return stroke due to return spring 44. As seen in FIG. 4d, the tooth 26 of the ratchet arm 22 engages the third tooth 38 of the ratchet gear 32 translating the ratchet gear 32 and its attached block valve counterclockwise (FIGS. 4e, 4f). When the solenoid 18 stops its stroke, the ratchet gear 32 and block valve means 42 have rotated a second 45 degrees. When the solenoid 18 completes its return stroke, the block valve means 42 and the ratchet gear 32 once again enter a relaxed stated. The device has performed one complete block cycle with the block valve means 42 having rotated a total of 90 degrees during the cycle. The block valve means 42 is now positioned so as to permit fluid flow through the fluid chamber 16 rendering the apparatus operable. In order to rotate the block valve means 42 another 90 degrees and thus reblock fluid flow through the fluid chamber 16, another block cycle is performed. The block valve means 42 and the ratchet gear 32 function in identical fashion.

Figure 5:
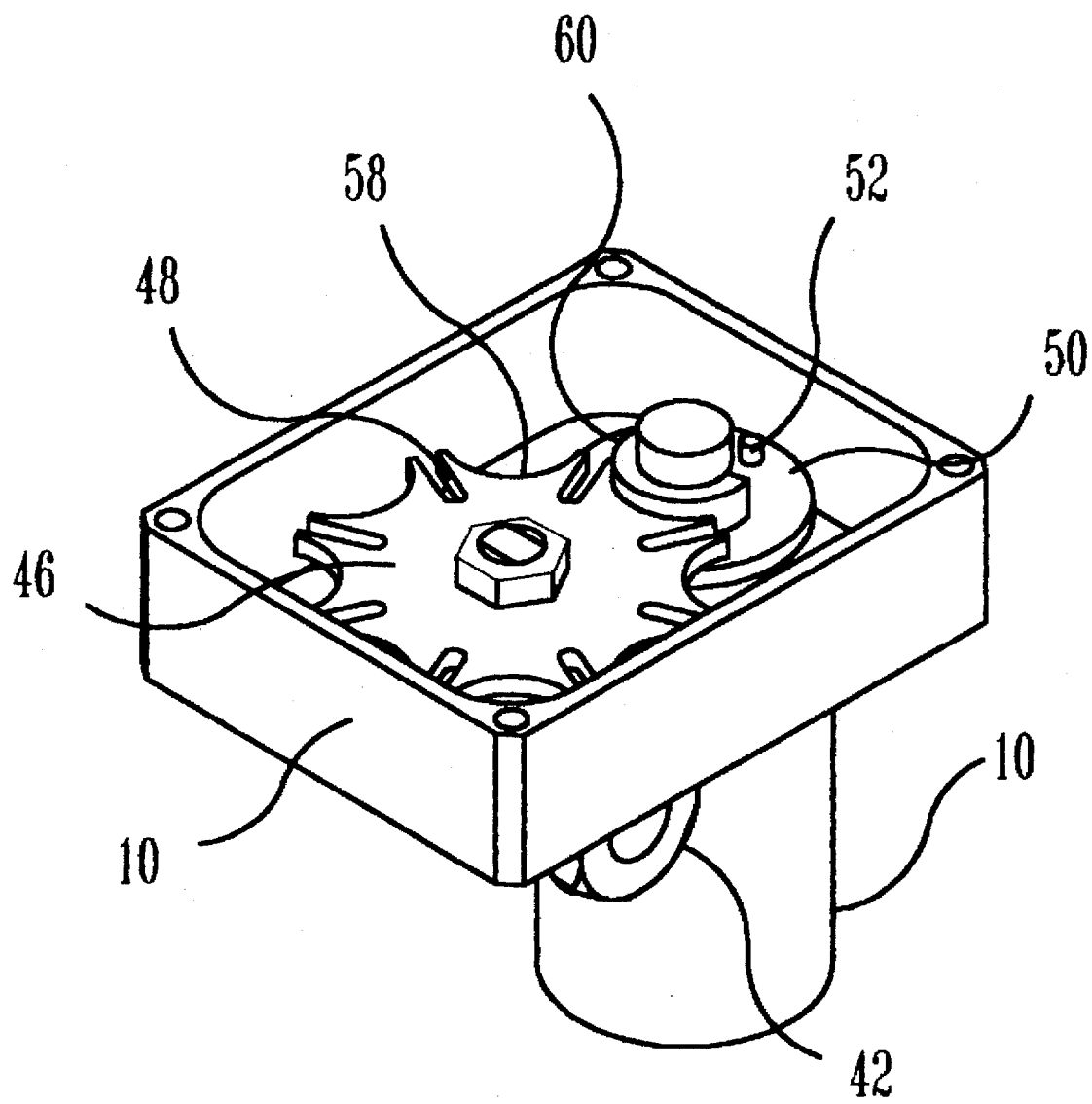
FIG. 5 is a perspective view of the second embodiment of the fluid block means.
Figure 6:
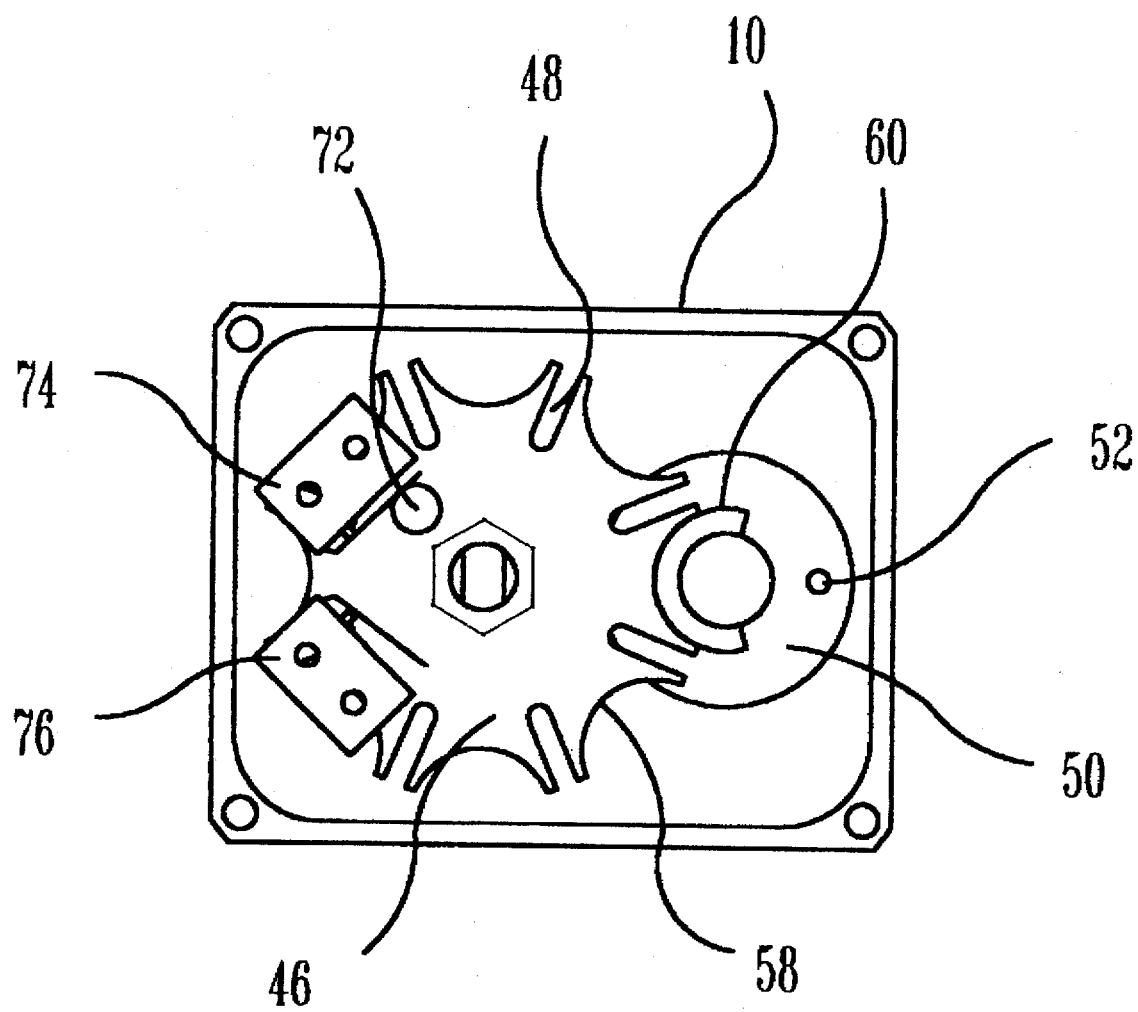
FIG. 6 is a top plan view of the second embodiment of the fluid block means.
Figure 7:
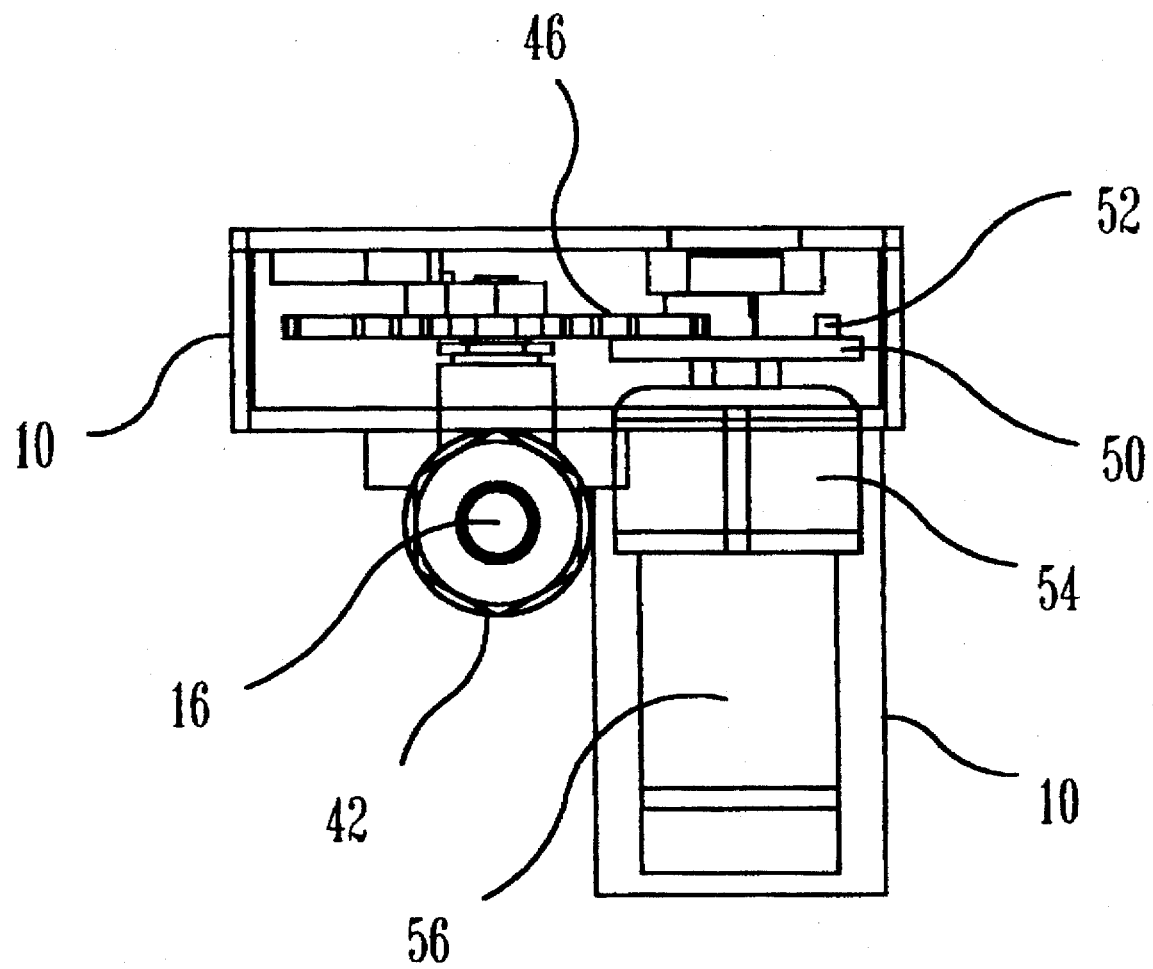
FIG. 7 is a side view of the second embodiment of the fluid block means.
Figure 8A:
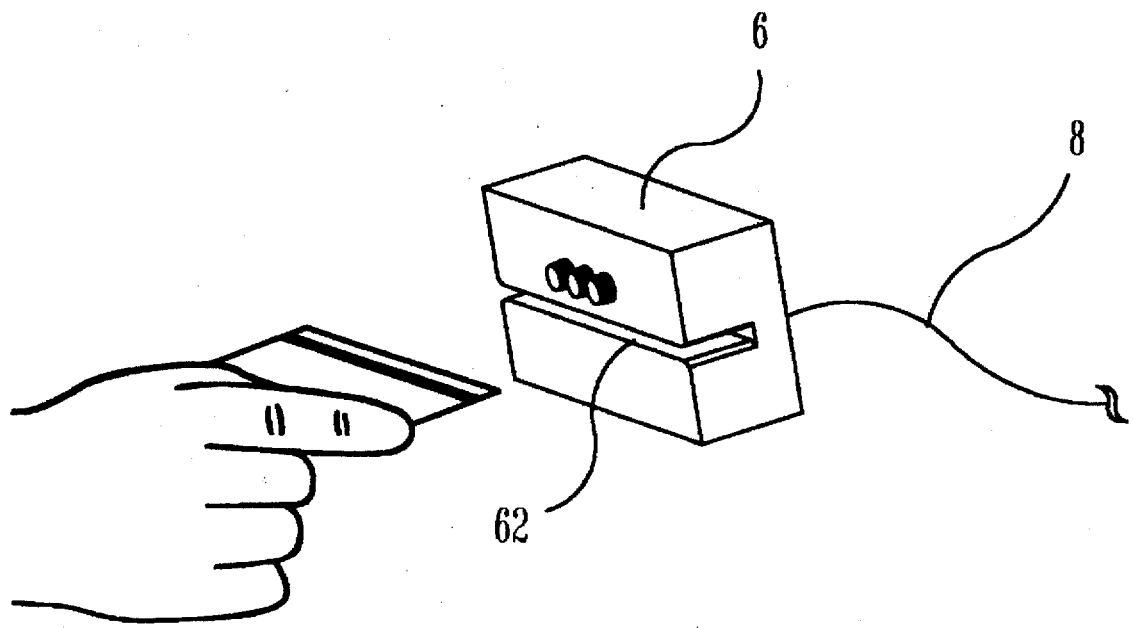
FIGS. 8a–8e are perspective views of the various embodiments of the input means associated with the control means.
Figure 8B:
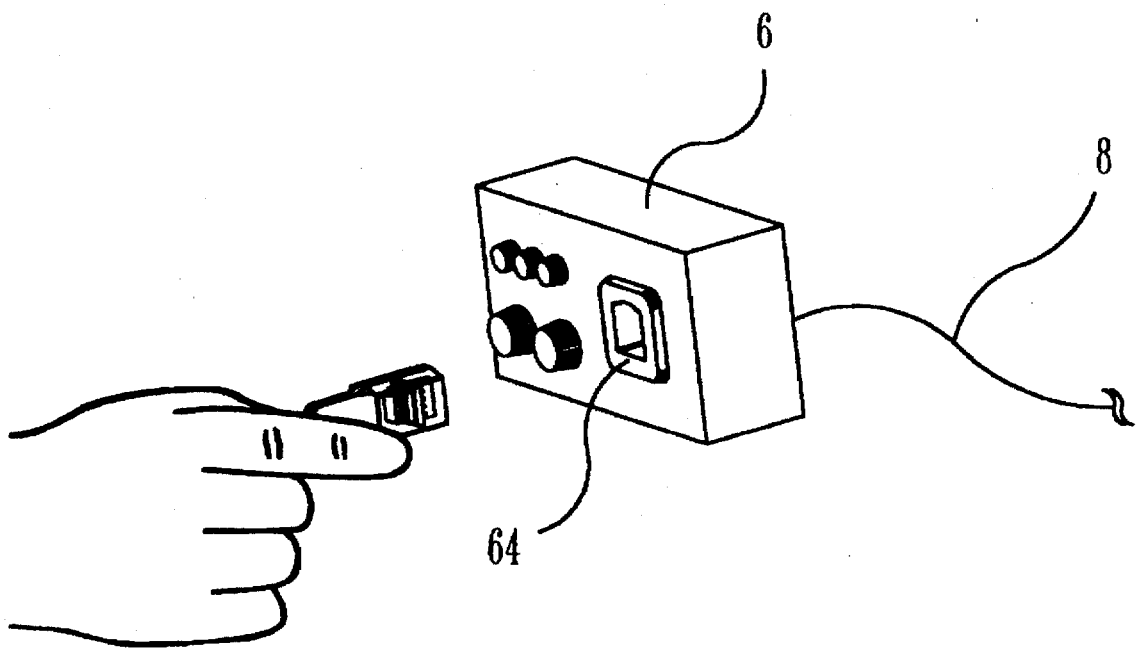
Figure 8C:
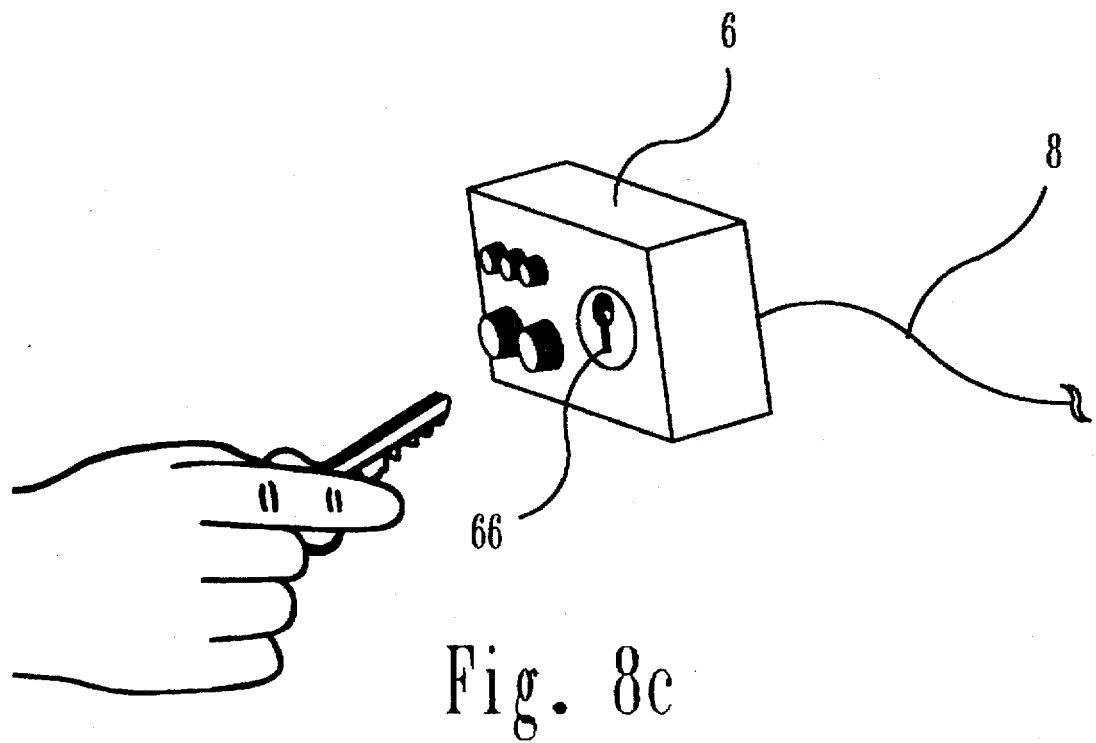
Figure 8D:
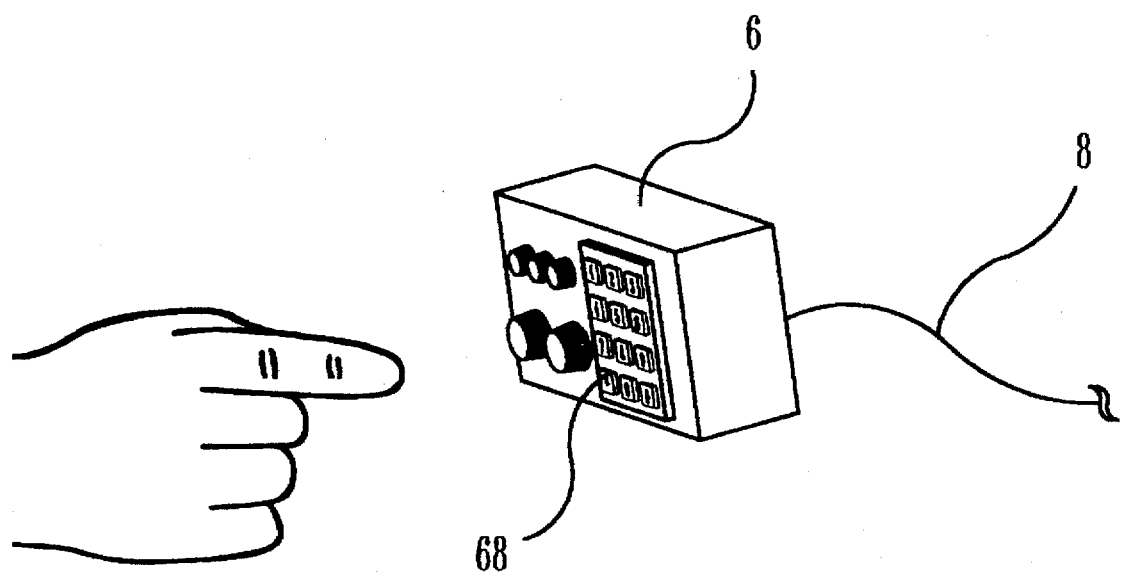
Figure 8E:
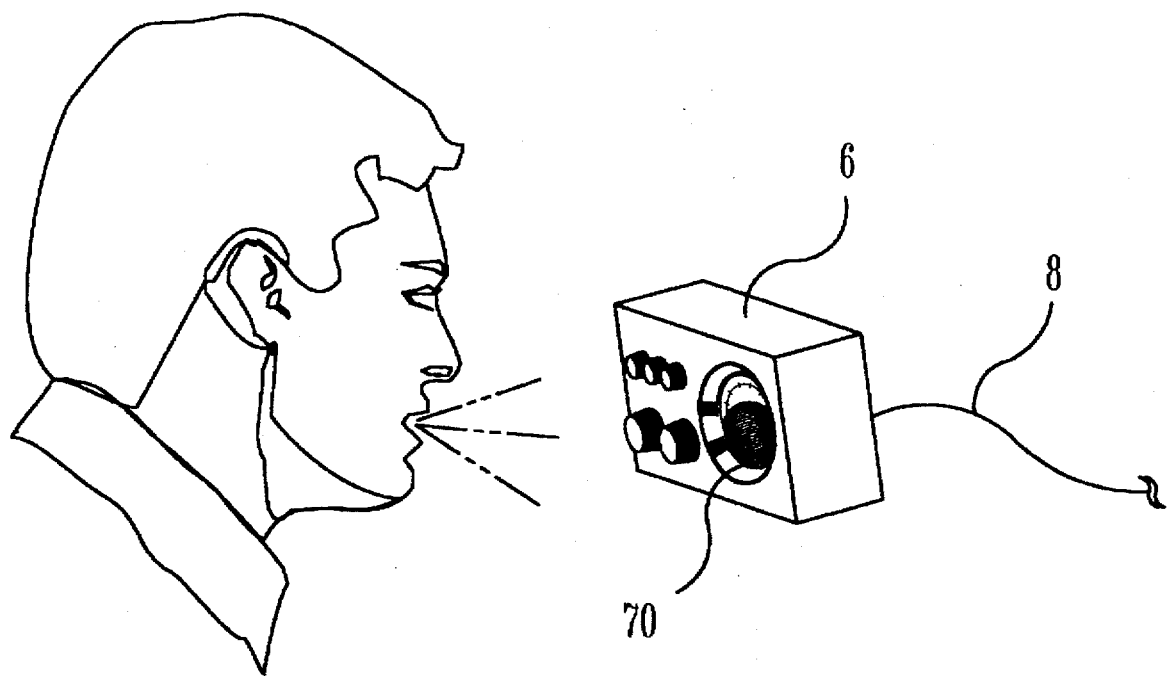

FIGS. 5–7, disclose an alternate embodiment of a fluid blocking means. This embodiment 4 comprises a fluid chamber 16 that is positioned in the fluid flow path of a fluid line as usual. The device has a block valve means 42 that permits fluid flow in through the fluid chamber 16 when the block valve is in an open position and prevents fluid flow through the fluid chamber 16 when the block valve means 42 is in a closed positioned.

Positioning of the block valve means 42 is controlled by slotted disk 46, having one or more articulating members 48 and one or more of radius cuts 58, mechanically connected to the block valve means 42. A limit switch pin 72 is positioned on top of the slotted disk 46. The articulating members 48 are indexed by a rotating drive member 50 having a pin 52 thereon to engage and rotate the articulating members 48. A raised arc section 60 is located on top of the drive member opposite the pin 52. A reversible electric motor 56 rotates the drive member 50. A gear reduction assembly 54 is positionable between the motor 56 and the drive member 50 in order to reduce the speed and increase the torque of the drive member 50. A pair of spaced apart limit switches 74, 76 are located above the slotted disk 46 opposite the drive member 50.

Initially the block valve means 42 is in an open position permitting fluid flow through fluid chamber 16. When the motor 56 receives an energization signal from the control means 6, the motor begins operation causing rotation of the drive member 50. Pin 52 engages one of articulating members 48 thereby rotating the slotted disk 46 and thus the block valve means 42. Slotted disk 46 continues to rotate until limit switch pin 72 contacts one of the limit switches 74. The contacted limit switch 74 deenergizes the motor thereby ceasing rotation of the drive member 50, slotted disk 46 and the block valve 42. When so ceased, the block valve means 42 has rotated 90 degrees placing the block valve means 42 into a closed position and thereby preventing fluid flow through fluid chamber 16. The block valve means 42 has completed one block cycle.

During the next block cycle, the motor 56 rotates in reverse direction from the prior block cycle. In this second cycle, the pin 52 will rotate slotted disk 46, and thus block valve means 42, in reverse direction from the prior cycle. The motor continues operation until the limit switch pin 72 contacts the other limit switch 76 at which time the motor 56 stops.

When the device is not performing a cycle, the raised arc section 60 is received within and remains in one of the slotted cuts 58—the cuts 58 having identical radius to the radius of the raised arc section 60—thereby preventing accidental rotation of the slotted disc 46.

Energization and deenergization of the solenoid 18, or reversible electric motor 56 is controlled by the control means 6. The control means has an input means for receiving an input signal from a user. As seen in FIG. 8 the input means 6 can comprise a magnetic strip card reader 62, a computer chip key reader 64, electronic key switch 66, keypad 68, voice recognition module 70, or other similar device for receiving a signal from a user and validating the signal so entered. When the input means 6 receives a properly validated signal, a coded energization signal is communicated, by the control means 6, to the solenoid 18 or reversible electric motor 56 via the fiber optic link 8. The coded energization signal causes the solenoid 18 to be briefly energized causing it to perform a retract stroke followed immediately by an extension stroke thereby completing one complete block cycle. Alternately, the coded energization signal causes energization of the motor 56 until deactivated by one of the limit switches. Once so deactivated, the control means 6 signals the motor 56 to reverse direction upon its next energization.

By communicating the energization signal via a fiber optic link 8, the device cannot be circumvented by disassembly of the control means 6, and manually sending an energization signal directly to the solenoid 18 or motor 56.

The control means 6 can be designed so that when the apparatus wherein the invention is installed is in a blocked, (disabled) condition, the controls means disables the apparatus' electrical system. This prevents inadvertent operation of the apparatus. The control means 6 can also designed so that when the apparatus is operational, the control means 6 is prevented from sending any signal to the solenoid 18 or electric motor 56 preventing accidental apparatus disablement.

While the invention has been particularly shown and described with reference to embodiments thereof, it will be understood by those skilled in the art that various changes in form and detail may be made without departing from the spirit and scope of the invention.

I claim:

1. A fiber-optic linked fluid block apparatus comprising:
    a fluid chamber disposed in the fluid flow path of the fluid line;
    a block valve means, disposed within the fluid chamber, for permitting fluid flow and blocking fluid flow through the fluid chamber;
    a ratchet gear, having four evenly spaced apart teeth, connected to the block valve means;
    a solenoid having a shaft and return spring;
    a first ratchet arm, having a first end attached to the shaft, a second end, and a tooth located therebetween;
    a second ratchet arm, having a first end attached to the shaft, a second end, and a tooth located therebetween;
    a spring attached between the second end of the first ratchet arm and the second end of the second ratchet arm;
    a control means for electronic control of the solenoid; and
    a fiber optic means for electronically linking the solenoid with the control means.

2. The device as in claim 1 wherein each tooth of the ratchet has a rounded edge.

3. The device as in claim 1 wherein the control means comprises:
    a slotted disk, having one or more spaced apart articulating members and a limit switch pin, connected to the block valve means;
    a first limit switch and a second limit switch, located in close proximity to the slotted disk;
    a reversible motor;
    a drive member, having a pin thereon, driven by the motor; and
    wherein when the motor is energized the drive member is rotated such that the pin engages one of the articulating members and the motor continues rotating until the limit switch pin contacts one of the limit switches.

4. The device as in claim 3 to further include a gear reduction disposed between the drive member and the motor.

5. The device as in claim 3 to further include:
    a plurality of spaced apart radius cuts located on the outer circumference of the slotted disk;
    a raised arc section, dimensioned to snugly fit within one of the spaced apart radius cuts, located on the top surface of the drive member; and
    wherein when the reversible motor is not energized, the raised arc section is received within one of the radius cuts.

6. The device as in claim 1 to further include an input signal means for receiving input signals, used to control the control means, from a user.

7. The device as in claim 6 wherein the input signal means comprises a keypad.

8. The device as in claim 6 wherein the input signal means comprises a voice recognition module.

9. The device as in claim 6 wherein the input signal means comprises a magnetic strip card reader.

10. The device as in claim 6 wherein the input signal means comprises a computer key chip.

11. The device as in claim 6 wherein the input signal means comprises a electronic key switch.

12. A fiber-optic linked fluid block apparatus for selectively interrupting fluid flow through a fluid line comprising:
    a fluid chamber, disposed in the fluid flow path of the fluid line;
    a block valve means, disposed within the fluid chamber, for selectively interrupting the fluid flow through the fluid chamber;
    a valve control means comprising ratchet gear, having four evenly spaced apart teeth, connected to the block valve means;
    a solenoid having a shaft and return spring;
    a first ratchet arm, having a first end attached to the shaft, a second end, and a tooth located therebetween;
    a second ratchet arm, having a first end attached to the shaft, a second end, and a tooth located therebetween;
    a spring attached between the second end of the first ratchet arm and the second end of the second ratchet arm;
    an electronic control means for electronically controlling operation of the valve control means;
    a fiber optic means for electronically linking the valve control means with the electronic control means; and
    wherein when the solenoid is energized, the shaft is retracted such that the tooth of the second arm engages and translates one of the teeth of the ratchet gear and when the solenoid is deenergized, the return spring causes the shaft to be pushed outwardly such that the tooth of the first arm engages and translates one of the teeth of the ratchet gear.

13. The device as in claim 12 wherein each tooth of the ratchet gear has a rounded edge.

14. The device as in claim 12 to further include an input signal means for receiving input signals, used to control the control means, from a user.

15. The device as in claim 14 wherein the input signal means comprises a keypad.

16. The device as in claim 14 wherein the input signal means comprises a voice recognition module.

17. The device as in claim 14 wherein the input signal means comprises a magnetic card strip reader.

18. The device as in claim 14 wherein the input signal means comprises a computer key chip.

19. The device as in claim 14 wherein the input signal means comprises a electronic key switch.

* * * * *